Patented Oct. 9, 1934

1,975,888

UNITED STATES PATENT OFFICE 1,975,888

ARRANGEMENT IN HYDRAULIC TURBINES

William M. White, Milwaukee, Wis.

Application February 23, 1932, Serial No. 594,457

2 Claims. (Cl. 253—117)

This invention relates in general to the art of fluid translating devices and relates more particularly to an arrangement in hydraulic turbines of the propeller and Francis types.

In turbines of these types the essential requirements are: first, high power and revolutions under the available head; second, high efficiencies; third, minimum of cavitation, particularly at the runner vanes and adjacent parts; fourth, minimum of vibration of the turbine parts.

To meet the first requirement a maximum quantity of water must be discharged through a minimum diameter of opening, which results in high velocities of flow at the discharge edges of the runner vanes, and accompanying low piezometric pressures thereat. And a high rotative speed of the runner invites a discharge of the water from the runner not only at high absolute velocity, but also of a pronounced whirl in the direction of rotation of the runner, this whirl being particularly pronounced at the outer discharge diameter portions of the runner, that is, adjacent the stationary discharge ring usually provided and forming the upper portion of the draft tube of the turbine.

To meet the other essential requirements stated, the hydraulic losses and disturbances in the flow of water while passing through and beyond the runner must be maintained at a minimum.

It is, therefore, the prime purpose and object of this invention to provide an arrangement of turbine construction which materially contributes toward obtaining the above stated essential requirements.

It is, therefore, also a specific object of this invention to provide in a turbine arrangement, a construction of draft tube having portions thereof related with respect more particularly to the outer discharge portions of the vanes of a runner of a hydraulic turbine of the type defined above, whereby through the agency of created reactive inwardly directed pressures due to the peculiar formation of said draft tube portions, the streams of water flowing along the two faces of each runner vane are brought together close to or preferably at the lower or discharge edges of the vanes and held together, and one of these streams forced against the back face of each respective vane, by said created pressure, to avoid the sudden drop in the break-off curve and the accompanying rise in the efficiency heretofore noticeable just before the break-off point, and also to simultaneously obviate as much as possible the undesired formation of voids, extending generally in the lines of the faces of the vanes, which are due to the finite surfaces at the extreme discharge surface or edge of the vanes and the action thereupon of the said streams flowing along the faces of the vanes.

It is, accordingly, also a specific object of this invention to provide in an arrangement, as above set forth, a draft tube having a definite constriction related in a definite manner with respect to the runner and discharge edges thereof, which constriction serves to pull the above described streams at the faces of the vanes together more promptly after the water issues from the runner, to form a solid mass of discharging water and to thereby attain below or beyond the plane of the constriction a more effective regainer action in the draft tube.

Another object of the invention is to provide a constriction in a draft tube just below the discharge edges of the runner rotatable therein, to effect a backing up of the pressure near the discharge edges of the runner vanes and periphery of the runner, to realign the pressures of the water within the runner vanes, possibly as far back as the guide vanes themselves, resulting in corresponding rearrangements of the flow lines, especially through the outer diameter portions of the runner, to which the increased efficiency for the instant turbine arrangement is attributable in addition to the decreased amount of cavitation, as stated above, especially at the outer discharge diameter portions of the runner and adjacent cooperating parts.

Other objects and advantages of the present invention will become apparent from a consideration of the detailed description in the specification and of the drawings forming a part thereof, and on which like reference characters are used to designate the same parts or elements throughout the various views.

Figure 1:
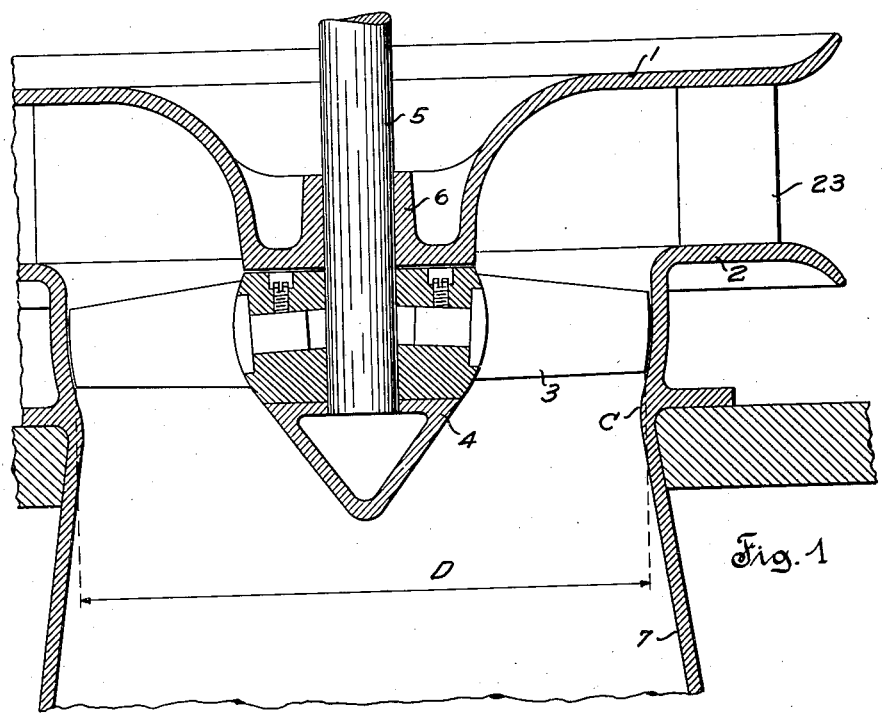
Fig. 1 illustrates the arrangement in a propeller type of hydraulic turbine, the turbine being shown in axial longitudinal section.

Referring to Fig. 1 it will be seen that cover plate 1 and a discharge ring 2 provide an annular radial inflow passage for the water to be admitted to the runner, the flow in which is regulatable by guide vanes 23 which may be rotatable as is commonly the case, and an axial flow passage merging therein, and in which the runner vanes 3, which may be adjustable, as shown, of a propeller type of runner are positioned. The runner further consists of a hub 4 in which the vanes may be rotatively mounted, the hub being fixed to a main shaft 5 journalled in a suitable bearing 6 supported by the cover plate 1. The generally axially directed portion of the discharge ring 2 merges into a flaring draft tube proper 7, at C, the point of constriction, and for purposes of this disclosure the draft tube may be considered as one composite element providing in addition to the radial inlet passage, an axial flow passage to the runner and a discharge passage for the water flowing from the runner with a constriction at the point C in said latter passage, located at a certain desired distance from the discharge edges of the runner.

Figure 2:
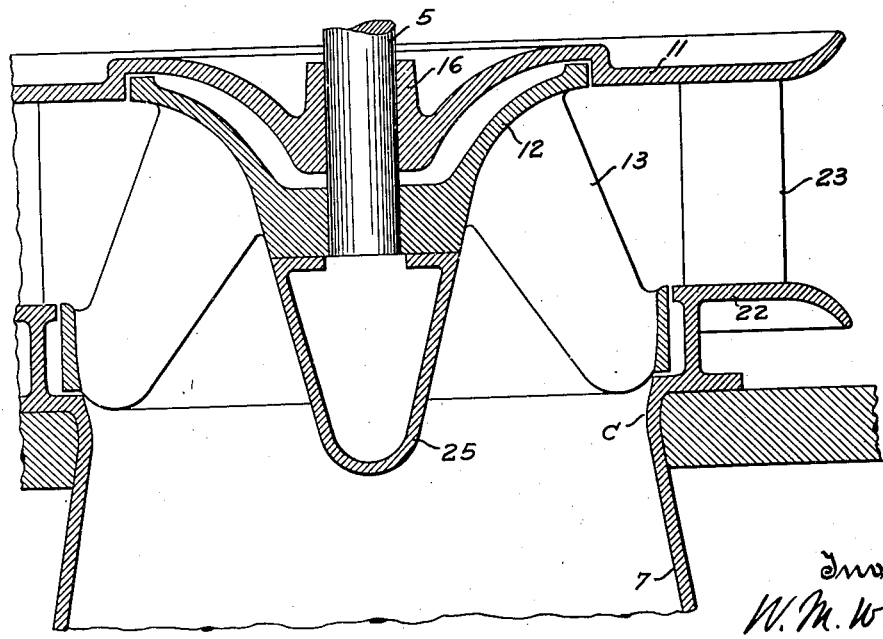
Fig. 2 illustrates the arrangement in a Francis type of hydraulic turbine, the turbine being similarly shown in axial longitudinal section.

That the arrangement is applicable also in connection with a Francis type of hydraulic turbine is illustrated by Fig. 2. The cover plate 11 of this turbine is provided with the usual form of inner portion, to receive the crown 12 of its Francis runner having mixed flow vanes 13, and for mounting a bearing 16 in which the main shaft 5 is journalled. The form of the discharge ring 22 is, however, seen to be different from the form of the discharge ring 2 of the turbine shown in Fig. 1, to permit of nesting the shroud ring secured to the periphery of the circumferentially disposed vanes 13, and to maintain and provide with the inner surface of the shroud ring in connection with the draft tube proper 7, a similar form of axial flow passage as described for the showing of Fig. 1. The Francis runner further comprises of a nose or hub portion 25 which merges with the crown 12 thereof.

Having now described hydraulic turbine constructions embodying the instant arrangement constituting this invention, the theory and principle underlying the invention will here be enunciated and explained.

Figure 3:
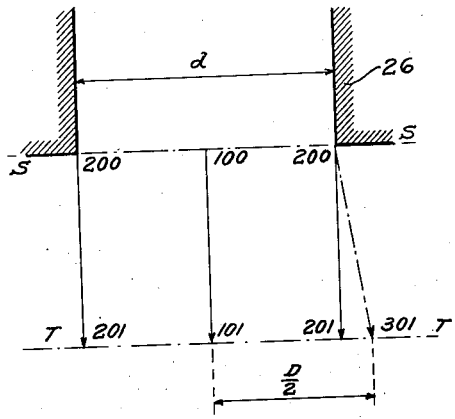
Figs. 3, 4 and 5 are diagrammatic views vectorially illustrating the flow lines of water discharging from a runner to which the instant arrangement is directed.

Referring to Fig. 3, a vertically mounted cylindrical discharge conduit 26 having an internal diameter $d$, is assumed to discharge water in axial directions with a velocity U from the plane S—S of its discharge orifice. The individual streams constituting this discharge water may be represented by lines parallel to the center or axial line 100—101, each of a velocity U, and the outer lines 200—201 combine to form a cylinder of the same diameter as the diameter of the conduit 26.

Figure 4:
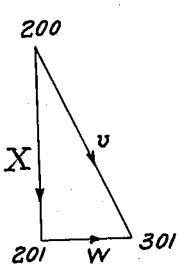
Figure 5:
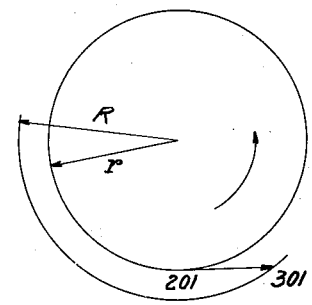

It is now assumed that the flow through the conduit 26 is constituted of a whirl in which case the flow of an outer stream 200—201 of the discharge water therefrom, is changed in direction to be along the line 200—301 which is not parallel to the axis of the conduit 26, but directed so as to have a forward component 201—301 in the direction of rotation, as indicated in the plan view of Fig. 5. In Fig. 4 this whirl component 201—301 corresponds to a velocity W and in this figure the line 200—201 corresponding to a velocity X represents the axial component of the velocity $v$ of the modified outer stream line 200—301. These modified stream lines of Figs. 4 and 5 are not parallel to the axis of the conduit 26 and therefore are not enveloped by a cylinder as before described, but by a rotary hyperboloid, the radial section of which may be represented by the outwardly inclined line 200—301 in the plane of Fig. 3. In other words the jet discharged from the conduit 26 under the newly assumed conditions will spread to a diameter proportional to the radius D/2, measured in the plane of the line T—T, at which the before described flow lines have been considered as terminating. Also the inherent piezometer pressure of the jet at the plane T—T will be more than it was at the plane S—S.

Figure 6:
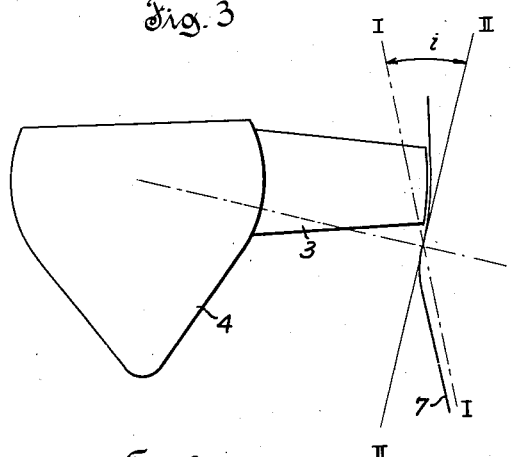
Fig. 6 illustrates the arrangement in connection with a single vane of the runner shown in Fig. 1 and shows the directrices of the draft tube inner surface portions above and below and merging into the constriction thereof.

Referring now to Fig. 6, line I—I is used to indicate the direction taken by the stream lines represented in Fig. 3 by line 200—301. It is evident that if the draft tube 7 of Figs. 1 and 2 were constructed so as to coincide with line I—I as a directrix that the water would follow this directrix, in other words, the water column discharging from the runner positioned within the upper portion of the draft tube, would rapidly flare outwardly, to decelerate the flow resulting in a suction effect or such a low piezometer pressure that it would produce conditions at the discharge edges of the runner vanes which would impede the attainment of the results recited above under requirements 1 to 4. These contentions are borne out by actual test data obtained from a propeller turbine construction with merely a flared configuration of the draft tube inner surface below the discharge edges of the runner. Low readings were obtained with a piezometer tube inserted transversely of the draft tube and located at a point therein just below the discharge edges of the runner or at a point intermediate the discharge edges and the point C of the constriction constituting the improvement of the instant arrangement. These low readings were attributable to voids formed as continuations of the discharge edges of the vanes, which will be explained in connection with the showing of Fig. 8.

Figure 8:
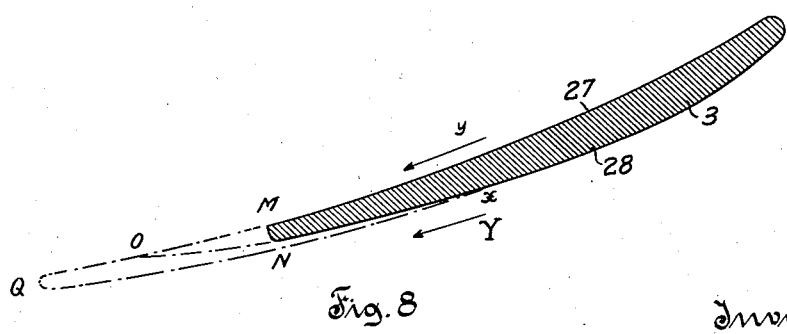
Fig. 8 is an end view of a runner vane, looking in the direction of the discharge edge thereof, and illustrates the voids heretofore formed thereat, and providing the low piezometric pressures thereat which voids it is desired to diminish with the arrangement of this invention.

Assuming even reasonably blunt discharge edges for the runner vanes, voids of the outline of wedge form MNO were believed to extend from the discharge edges of the vanes, and defined more or less by continuations of the curves constituting the curvature of the front and back faces 27 and 28 respectively, of each vane, and it may be that the voids extended from a point such as Q to a point $x$ in the back face of the vanes, as indicated on Fig. 8. That the latter condition may have been existent seemingly is revealed by the fact that test data obtained from the mentioned turbine not having the constriction produces a break-off curve wherein there is a sudden drop at a point corresponding to a point in the vanes still ahead of the discharge edges thereof, which revelation is believed to be due to the stream flowing along the back face of the vane having been disconnected at this point from that face of the vane causing the increased extent of the voids as last related. The extent of these voids in existing turbines may be said to be dependent upon two factors, the velocities of the streams $y$ and $Y$ flowing respectively, over the front and back faces 27 and 28 of the vanes and secondly, to the bluntness or extent of the surfaces at the discharge edges MN of the vanes and the barometric pressure prevailing at and surrounding the wedge-shaped void forms MNO. It is at once obvious that the smaller the values of $y$ and $Y$ and the greater the barometric pressure, the smaller will be the extent of the wedge form of the voids and the disturbances. These voids cause cavitation of the adjacent surfaces and produce vibrations and to some extent instability of the hydraulic conditions in a turbine. Therefore, any increase of the pressure (barometric as well as piezometric) at the front and back faces of the vanes will tend to reduce the magnitude of these voids and their accompanying disturbances, and it is accordingly a principal purpose of this invention to provide an arrangement which accomplishes this diminution of the voids.

It has been stated the draft tube is provided with a definite constriction at a certain distance from the discharge edges of the runner, determined by the axial extent of the above described voids. In both Figs. 1 and 2 this constriction has been referred to as being at the point C. The drawings are to indicate that the flow areas in the planes passing through the constriction points C of both of the illustrated types of turbines, is less than the flow areas through the runners, measured above the constriction area. In other words, the desired effect of the constriction at the point C is that it is intended to provide a higher discharge velocity in its plane than prevails in the section or plane defined by the diametrical line D in Fig. 1, or still in other words, to provide a retardation in the flow of water directly below the runner, whereby a desired relative increase of the piezometric pressure at the area of the draft tube at diameter D as compared with that at the area of the draft at the constriction point C is realized. Since the similar draft tubes for these two turbines have constrictions, each is formed with annular surface portions converging toward and merging so to speak in said constriction point C. The directrix I—I of Fig. 6, corresponding to one of these annular surface portions, has already been discussed in connection with a purely flared draft tube inner surface formed with this directrix. The manner in which the other directrix II—II of Fig. 6 cooperates when used to form the inner surface portion above the constriction described in connection with the turbines shown in Figs. 1 and 2, will now be explained in connection with the showing of Fig. 6 and Fig. 7, which figures are founded on the theory and principles stated in connection with the showings of Figs. 3, 4 and 5.

Figure 7:
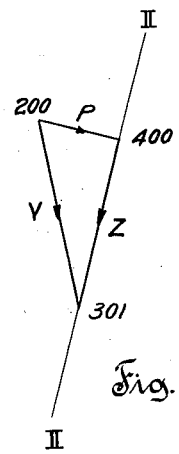
Fig. 7 is a velocity diagram wherein the velocity vector $v$ of Fig. 4 is referred to the directrix for the inner surface portion of the draft tube below the constriction and resolved into its components at right angles to and along the other directrix.

Referring first to Fig. 7, the velocity vector V of the flow line 200—301 can be resolved into a component 400—301 or velocity vector Z along the directrix II—II and a component 200—400 or velocity vector P normal to the directrix II—II. The angle included between the directrices II—II and I—I may be referred to as angle $i$ and since it is shown as being other than zero, it is obvious that Z being V cos $i$ is smaller than V, consequently the constriction at C will somewhat reduce the discharge capacity of the runners of the two types of turbines shown in Figs. 1 and 2. It is proven, however, by actual tests that due to a considerable gain in efficiency that the output of the runner is increased in spite of the somewhat reduced discharge. The normal velocity component P manifests itself in the form of a created reactive, generally inwardly directed pressure which is instrumental in reducing the voids described above by causing the two streams flowing along the two faces of the runner vanes to be pulled together and held together most desirably at points immediately adjacent the discharge edges of the runner vanes, and in urging and retaining the stream flowing along the back face of each vane against this face to provide a uniform efficiency as measured over the vane and generally in the direction of the flow of water, and in diminishing the accompanying disturbances, as more or less already fully explained in connection with the showing of Fig. 8. It is this velocity component P which reduces cavitation due to its rectifying or realigning effect upon the stream flow through the turbine, especially upon the outer flow lines of the water or the flow lines negotiating the outer discharge diameter portions of the runners, and it is also due to this rectifying and realigning effect that a more orderly process of flow is secured which results in the higher efficiencies obtained with this novel arrangement of constriction in the draft tube of a hydraulic turbine.

Although the present arrangement is more or less inherently applicable to turbines of the types shown, it is to be understood that it is also applicable to other hydraulic machines, such as centrifugal pumps, and in general to all such machines where this arrangement may eliminate or at least reduce the undesirable conditions explained above, and that as far as it is applied to hydraulic turbines of the types shown that it is not limited to a turbine having its main shaft vertically directed, for it may equally well be used in such a turbine if the shaft thereof makes any angle with respect to the vertical.

It is to be understood that it is not desired to limit the invention to the exact details of construction and operation shown and described for obvious modifications within the scope of the claims may occur to persons skilled in the art to which the invention appertains.

It is claimed and desired to secure by Letters Patent:

1. The combination with a hydraulic turbine having a runner, of a draft tube disposed to receive water discharged from said runner and having a constricted passageway adjacent to the outlet side of said runner of flow area less than the flow area below said constriction or the flow area above said constriction in the plane through the blade tips of said runner for retarding the flow of water from said runner to establish pressure opposing the formation of voids.

2. A hydraulic turbine, comprising a runner having radiating vanes, a casing enclosing said runner and arranged to constitute a passageway for directing water therethrough, and a draft tube connected to said casing in position to receive water therefrom and having a definite constriction in a transverse plane just below the discharge edges of the runner vanes of flow area less than the flow area through the runner above said constriction to retard the flow of water near the discharge edges of the runner vanes and so affect the pressure of the water within the runner vanes as to decrease cavitation at the vane edges and increase the efficiency of the turbine.

WILLIAM M. WHITE.